US006801909B2

(12) United States Patent
Delgado et al.

(10) Patent No.: US 6,801,909 B2
(45) Date of Patent: Oct. 5, 2004

(54) SYSTEM AND METHOD FOR OBTAINING USER PREFERENCES AND PROVIDING USER RECOMMENDATIONS FOR UNSEEN PHYSICAL AND INFORMATION GOODS AND SERVICES

(75) Inventors: Joaquin Delgado, Jersey City, NJ (US); Renaud LaPlanche, New York, NY (US); Mathias Turck, New York, NY (US)

(73) Assignee: Triplehop Technologies, Inc., New York, NY (US)

( * ) Notice: Subject to any disclaimer, the term of this patent is extended or adjusted under 35 U.S.C. 154(b) by 302 days.

(21) Appl. No.: 09/909,997

(22) Filed: Jul. 23, 2001

(65) Prior Publication Data

US 2002/0052873 A1 May 2, 2002

Related U.S. Application Data

(60) Provisional application No. 60/219,678, filed on Jul. 21, 2000.

(51) Int. Cl.[7] .............................................. G06F 17/30
(52) U.S. Cl. ..................... 707/4; 707/2; 707/3; 707/5; 707/104.1; 707/6
(58) Field of Search ............................ 707/104.1, 2, 10, 707/3, 7; 705/27, 10, 26; 709/203; 345/745; 700/83; 706/45

(56) References Cited

U.S. PATENT DOCUMENTS

| | | | | |
|---|---|---|---|---|
| 5,724,567 A | * | 3/1998 | Rose et al. ..................... 707/2 |
| 6,041,311 A | * | 3/2000 | Chislenko et al. ............ 705/27 |
| 6,064,980 A | * | 5/2000 | Jacobi et al. ................. 705/26 |
| 6,092,049 A | * | 7/2000 | Chislenko et al. ............ 705/10 |
| 6,112,186 A | * | 8/2000 | Bergh et al. .................. 705/10 |
| 6,202,058 B1 | * | 3/2001 | Rose et al. .................... 706/45 |
| 6,266,668 B1 | * | 7/2001 | Vanderveldt et al. ......... 707/10 |
| 6,289,354 B1 | * | 9/2001 | Aggarwal et al. ........ 707/104.1 |
| 6,438,579 B1 | * | 8/2002 | Hosken ...................... 709/203 |
| 6,484,164 B1 | * | 11/2002 | Nikolovska et al. ........... 707/3 |
| 2002/0107853 A1 | * | 8/2002 | Hofmann et al. .............. 707/7 |
| 2002/0130902 A1 | * | 9/2002 | Shaouy et al. .............. 345/745 |
| 2002/0151992 A1 | * | 10/2002 | Hoffberg et al. .............. 700/83 |

* cited by examiner

*Primary Examiner*—Frantz Coby
(74) *Attorney, Agent, or Firm*—Morrison & Foerster LLP

(57) ABSTRACT

A system and method for searching data repositories and for obtaining user preferences and providing user recommendations for unseen physical and information goods and services. The system includes, for example, four levels of filtering: content-based, collaborative, event-based and context-based. Filtering is designed to understand and anticipate a user's physical and information goods and services needs by learning about the user's preferences and the preferences of users similar to the user.

5 Claims, 6 Drawing Sheets

SYSTEM AND METHOD FOR OBTAINING USER PREFERENCES AND PROVIDING USER RECOMMENDATIONS FOR UNSEEN PHYSICAL AND INFORMATION GOODS AND SERVICES

CLAIM OF PRIORITY

This application claims the benefit of priority from Provisional Patent Application, U.S. Serial No. 60/219,678, entitled "SYSTEM AND METHOD FOR OBTAINING USER PREFERENCES AND PROVIDING USER RECOMMENDATIONS FOR UNSEEN PHYSICAL AND INFORMATION GOODS AND SERVICES", the contents of which are hereby incorporated by reference.

TECHNICAL FIELD

The present invention relates to systems and methods for searching data repositories and in particular, to a system and method for obtaining user preferences and providing user recommendations for unseen physical and information goods and services.

BACKGROUND ART

In today's information society, knowledge is often leveraged from the individual level to the community level. Distributed networks such as the Internet make it possible for information to be obtained, processed, and disseminated easily. However, as the availability of information increases, it becomes increasingly difficult for individuals to find the information they want, when they want it, and in a way that better satisfies their requirements. The overwhelming number of options and alternatives that e-commerce offers leaves many consumers confused and uncertain about what products and services may or may not meet their needs. Information seekers are able to take advantage of the myriad Internet sites purporting to provide the best and most current information on various subjects, but are unable to determine which sites are providing the most reliable and respected information. These disadvantages are especially true for consumers and information seekers who are uncertain for which physical and information goods and services they are looking. Purchasing and research decisions are increasingly more difficult when individuals are not only uninformed but also confused.

Using an approach traditionally favored by brick-and-mortar libraries, some Internet sites seek to alleviate these difficulties by serving as directories. The organizational scheme of such sites allow users to manually search for relevant documents by traversing a topic hierarchy, into which documents in a collection are categorized. The directory serves as a guide to help users reach particularly useful documents. Unfortunately, manually searching for documents online, while not as time consuming as manually searching for documents in a brick-and-mortar library, remains time consuming even if the directory is well-organized. In addition, the dynamic nature and constantly increasing size of the Internet makes it difficult to maintain current information.

The development of search engine technology and the application of such technology to the Internet has provided additional assistance to consumers and information seekers by reducing the need to manually search for documents. The first generation of Internet search engines, including Altavista, Excite/Inktomi, InfoSeek and others, incorporate the results of substantial research in information retrieval (IR) (which is concerned with the retrieval of documents from textual databases) and library science. As illustrated in FIG. 1, when using these search engines, a user is required to specify his/her information needs in terms of a query, which is then compared, typically at a simple keyword level, with titles of documents in a collection. The technology is designed to identify those documents that are most likely to be related to the query terms and correspondingly relevant to the user's information needs. Unfortunately, although such search engines quickly provide relevant information, they repeatedly fail to deliver accurate and current information. This is primarily because the original premises of IR, i.e., persistency of unstructured text documents and the existence of sizable collections, cannot be effectively applied to the constantly changing Internet.

Directories and search engines are considered "pull" technologies, because users must seek out the information and retrieve it from information sources. Alternate "push" technologies have been developed to reduce the time users must spend in order to obtain information from directories and sift through results returned by search engines. Users of these technologies subscribe to information "channels" and the content provider periodically "pushes" the updated information to the user's computer. From the user's point of view, the service performs automated frequent downloads of current information that is related to a user's general topic of interest. Unfortunately, this technology presents the same problems that plague the television and cable television industries—if it offers too few options, the content is very general—if it offers more options, the content is more specific, but users are unable to decide for which and how many services to subscribe. The continuous flow of information increases the need for filters, and for the user to customize those filters, to obtain information relevant enough to warrant the user's attention.

Research related to overcoming the limitations of prevalent "pull" and "push" models has recently focused on incorporating artificial intelligence (AI) technology into such models. In some modern information retrieval models, intelligent personal assistants or agents, in the form of software-based "robots" or "bots", are instructed to seek out information, sort discovered information according to individual user preferences, and present to the user only the most relevant information. The agents seek to perform a function similar to a travel agent or a secretary. Unfortunately, even these advanced systems suffer from the need to rely on user-specified preferences. The user is typically unwilling to spend time creating a user profile. Moreover, his/her interests may change over time, which makes it difficult to maintain an accurate profile. Further, because the systems rely on the user to specify his/her preferences, the specification process is sensitive to input errors, and its effectivity depends on the user's familiarity with the business domain being searched and the functionality of the agents. These systems are also limited in that the user-specified preferences must be specific to fixed domains or applications, preventing them from being easily adapted to other domains or applications.

The most recent advanced information retrieval systems seek to learn about the user and quickly present to the user recommendations for product and information goods and services based on the learned preferences. Three examples of learning user profiles include learning by given examples, stereotyping, and observation. In systems that learn by given examples, the user is requested to answer questions or provide examples of relevant information, and the system processes the information according to internal weighting rules and builds a user profile. While the process is simple, the examples may not be representative and the results are likely to be imprecise. In systems that learn by stereotyping, the system has defined a stereotype based upon accumulated statistics and users are assigned to one of the stereotypes based upon characteristics provided by the user. While these systems require little interaction with the user, their accuracy depends on the level of detail and the number of different stereotypes, as well as the user selecting the most important personal characteristics. In systems that learn by observation, the creation of user profiles is based on first observing the user's behavior over time, including recognizing, for example search inputs and user responses to the search results, and second on matching the user's information needs and the system's actions. While these systems require no interaction with the user, and can adapt to changes in the user's interests over time, they cannot be deployed immediately because they require a training period to become effective.

These "recommender" systems use such processes to compile "meta-information", that is, information at the knowledge level, and use several filtering layers to enable them to function more efficiently as agents and decision-making guides. Unfortunately, these first generation "recommender" systems are not effective for broad application across multiple business domains because they capture interest only in specific items. While personalizing and tailoring the recommendations to specific users would remedy this limitation, these systems cannot easily accomplish this without burdening the user by requiring manual input, which requires input time and invites input errors. Many of the current learning algorithms are not self-corrective and therefore fail to address the situation where the user has been presented with recommendations that do not seem to relate to his/her established preferences. Further, many of these systems are tailored to specific industries and cannot easily be adapted to be used with other industries. One specific example is found in the wireless client application industry, where location-based searches for information are particularly useful. However, the current location-based search engines used on wireless devices are not personalized to the specific user. Recommendations for services in the adjacent physical area are determined according to location and general interest, such as the type of store or restaurant the user desires to find. However, these recommendations do not consider the user's more specific preferences. As a result, in some metropolitan areas, the user must manually navigate a large list of recommendations on a small wireless device screen. The current "recommender" systems cannot be tailored easily to wireless devices because the systems are unable to process additional filtering information, such as location-based information, without substantial changes to the embedded algorithms. Even more importantly, these "closed" systems will not be able to easily accommodate more advanced and additional learning algorithms as they become available.

SUMMARY OF THE INVENTION

In one embodiment the invention provides a system and method for obtaining user preferences and providing user recommendations for unseen physical and information goods and services.

In another embodiment the invention provides an agent-based recommender system that is specific to a given business domain, but that can be easily replicated to other business domains.

In yet another embodiment the invention automatically maintains and learns individual user profiles to provide personalized and tailored results without burdening a user.

In still another embodiment the invention represents item profiles and user profiles as multi-level data structures and compares them at the attribute level to allow cross-domain recommendations. In one aspect of the invention, interests in features are captured rather than interest in items to reduce the amount of information needed from a user in order to learn an accurate profile.

In another embodiment the invention creates and updates item profiles and user profiles and that predicts a user's tastes and preferences based on at least one filtering method and preferably on a plurality of filtering methods. In one aspect, the invention employs user models and domain models, and incorporates four levels of filtering: content-based filtering, collaborative filtering, event-based filtering, and context-based filtering.

In yet another embodiment the invention is self-corrective when provided with user feedback to remain sensitive to changes in a user's taste.

In still another embodiment the invention is proactive and oriented toward e-commerce through the use of recommendations and targeted advertisements.

In another embodiment the invention provides explanations regarding provided recommendations. In one aspect of the invention, a user's interests are represented at the attribute level, and explanations regarding the reason for a recommendation are provided with reference to search criteria chosen by a user.

In yet another embodiment the invention can be adapted to integrate additional filtering methods. In one aspect, the invention integrates position-based filtering.

BRIEF DESCRIPTION OF THE DRAWINGS

The figures relate to a system and method of the present invention for obtaining users preferences and providing user recommendations for unseen physical and information goods and services. They are merely illustrative in nature and do not limit the scope of the invention to their embodiments.

DETAILED DESCRIPTION OF THE INVENTION

Figure 1:
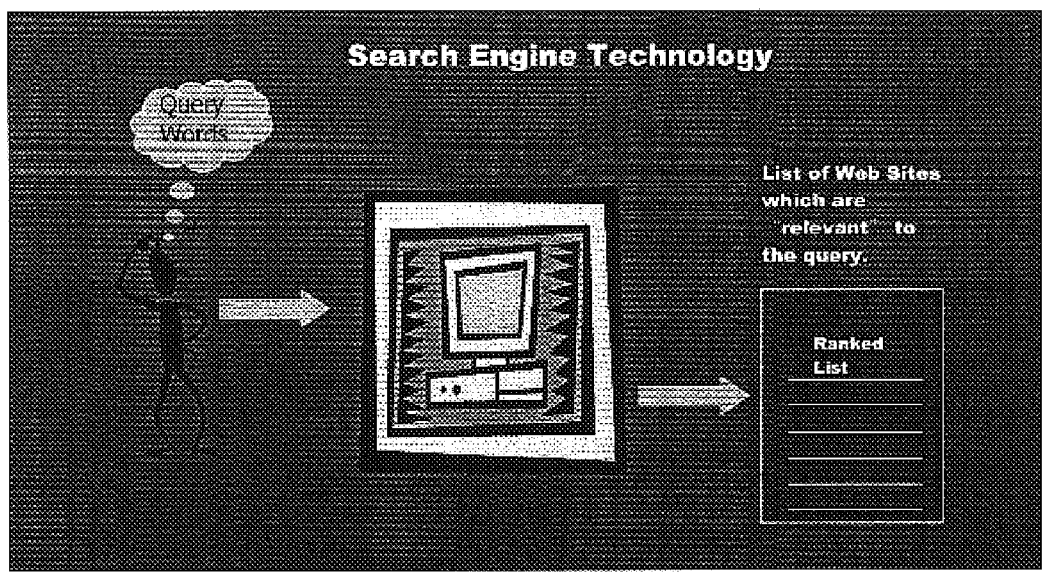
FIG. 1 illustrates a manually inputted profile system.
Figure 2:
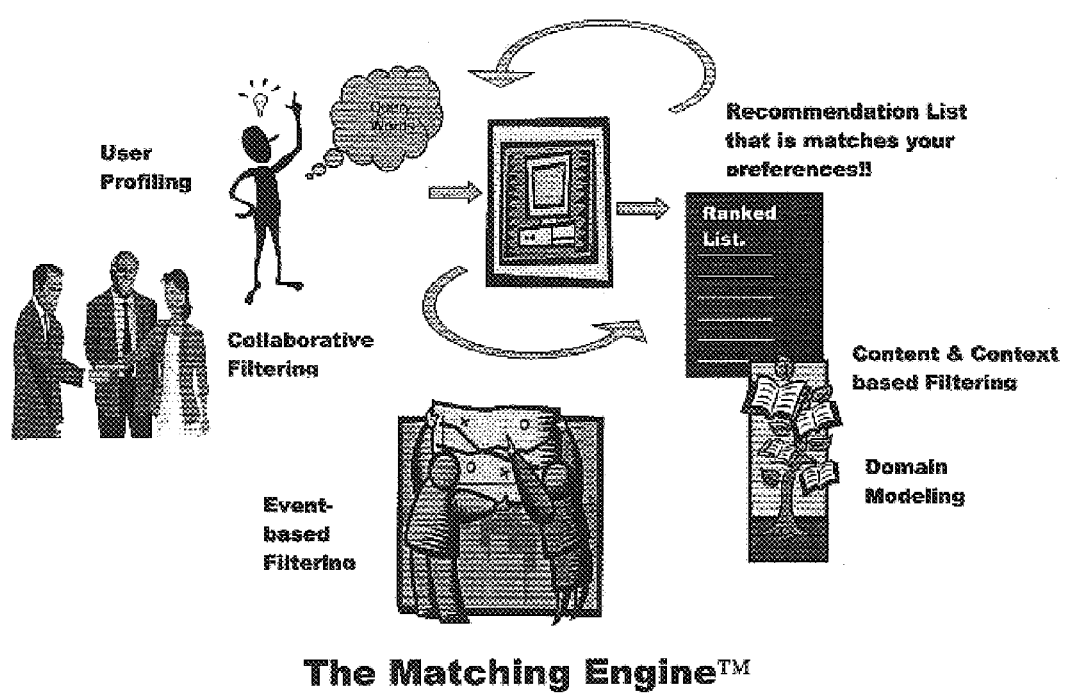
FIG. 2 illustrates an exemplary diagram of the present invention.

FIG. 2 is an exemplary diagram of the present invention. User preferences are obtained and user recommendations are provided for unseen physical and information goods and services. The invention comprises four levels of filtering: content-based filtering, collaborative filtering, event-based filtering, and context-based filtering. The filtering is designed to understand and anticipate a user's physical and information goods and services needs by learning about the user's preferences and the preferences of users similar to the user. It should be noted that other embodiments of the present invention may comprise any possible number or combination of the described filtering levels, including, for example, only one, two or three of the levels, alternate ordering of the levels, and use of the levels in combination with other filtering methods or recommender systems not described or discussed that would readily be appreciated by one having ordinary skill in the art.

Figure 3:
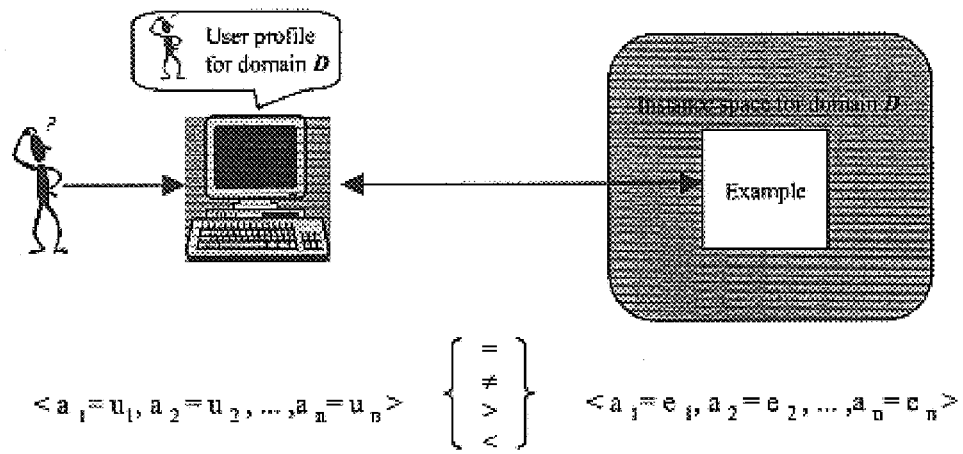
FIG. 3 illustrates an exemplary content-based filter of the present invention.

Content-based filters, illustrated in an exemplary embodiment in FIG. 3, support the acquisition and maintenance of user profiles. Systems and methods that use these filters commonly represent resources, such as Web pages, and user profiles under the same model. Commonly used models include, for example, Boolean models (employing keywords and logical operators), probabilistic models (using prior and posterior distributions of keywords within documents and applying conditional probabilities such as, for example, Bayesian rules, in order to predict relevance), and keyword vector space models. After the user profile has been obtained, it is compared with the instances being filtered using a similarity measure that evaluates relevance, such as, for example, the cosine similarity measure that common uses term frequency and inverse document frequency (TF-IDF) weights in the vector-based representation of both profiles and instances, compared in the vector space. Keyword-based search engines are a special case of stateless content-based filtering systems in which the user explicitly specifies his/her current interest by providing keywords and the system in turn generates a list of possible matches.

Figure 4:
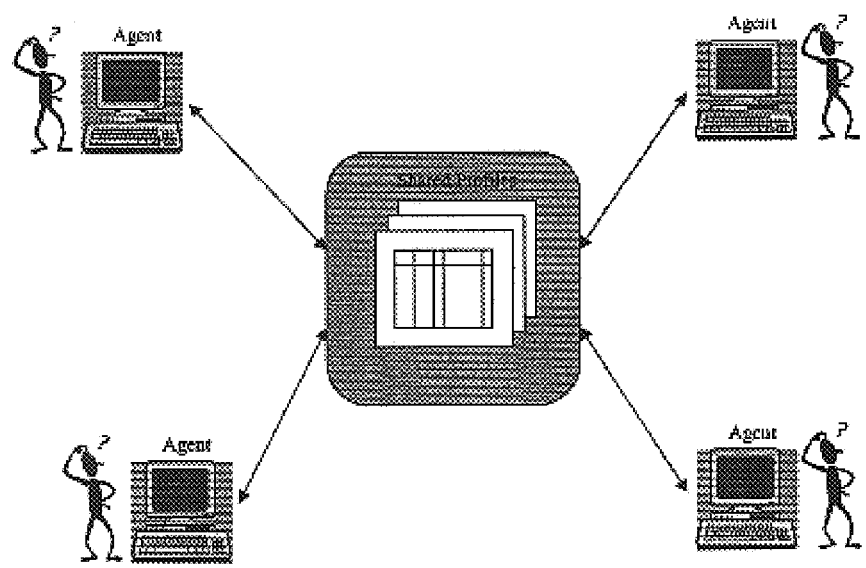
FIG. 4 illustrates a collaborative-based filter with shared impressions of multiple users regarding various items.

Collaborative-based filters, illustrated in an exemplary embodiment in FIG. 4, share the impressions of a plurality of users regarding various items. The impressions are expressed through a rating schema to enable the prediction of a rating for an unseen item and the subsequent presentation to the user of an item he/she most probably will like. The predictions are based on, for example, the previously captured ratings of similar users regarding the particular item, as well as the user's previously captured ratings regarding other items. The filtering process may have different levels of automation, ranging from the manual entry of ratings to the automated observation of a user's behavior. Collaborative rating is useful because individuals tend to heed the advice of trusted or similar people. In addition, it is easier for an individual to like (dislike) an item similar to an item the individual is known to like (dislike).

Automated collaborative filtering (ACF) may be used to implement a collaborative predictive function. ACF, such as, for example, the Pearson-r Correlation method, have been used in "one-to-one marketing" and "personalization" systems to allow people to find other people with similar opinions, analyze the structure of people's interests in various subjects, facilitate the creation of interest groups, and improve the targeting of announcements and advertisements. Well-known machine learning mechanisms, such as artificial neural networks and Bayesian networks, have also been implemented and evaluated for use as collaborative filters. Additionally, inductive learning and online learning methods have recently been investigated. The present invention implements a machine learning method for collaborative filtering called memory-based weighted majority voting (MBWMV) on an attribute-based tree-like structure. This method is explained in greater detail below.

Event-based filters track the navigational habits of users of data repositories such as the Internet. Contrary to traditional marketing strategies, which are based on statistical profiling, the individual profiling made possible by event-based filters provides detailed information about a user's tastes and preferences. This information can be used to personalize an information-gathering experience and recommend highly relevant physical and information goods and services. One example of event-based filtering is the process of recording query-based searches and associating a set of recorded queries with a particular user. The record of queries submitted by a user is useful for modeling the user's interest behavior. Generally, time is the most important factor in effective event-based filtering, and systems using event-based filters should be able to adapt over time to a user's needs and interests, in order to produce meaningful recommendations to the user throughout the user's interaction with the system.

Context-based filters use contextual information to determine the relevance of search results. When supposedly meaningful contextual information, such as a topology among items in a target space, exists or is inferred, such information can be used to define context-sensitive rules tailored to the target space that can be applied to strengthen semantic relationships among different items to more accurately predict a user's interest in a given item. One example of context-based filtering is automated citation indexing (ACI), which has been used to improve the dissemination and retrieval of scientific literature in large digital libraries such as the Internet. Scientific citations are an existing topology on top of the scientific literature space that subsumes the concept of reputation in that well-known papers are often referenced. ACI uses this measure of reputation to assign greater weight to certain documents over others.

Another topology that may be used in the context-based filtering of the present invention is the link structure of the Web. The Web can be modeled as a graph and it is possible to use simple measures and heuristics to establish reputation sub-graphs of Web sites to enable the ranking of keyword-based searches. For example, in certain environments, a Web page is considered important if important pages are linked to it. That is, if a respected magazine publishes a story about a company and links to it from the magazine's Web page, that company's own Web page becomes more important by association. Measures such as the number of Web pages that link to a page and the number of links contained in a Web page have given rise to methods that calculate "hubs" and "authorities". A Web page is considered an authority if it contains large amounts of information about a given topic. A Web page is considered a hub if it includes a large number of links to Web pages having information about the topic. For example, a Web page presenting a resource list on a specific topic would be considered a hub. Thus, hubs and authorities are distinct types of Web pages that exhibit a natural form of symbiosis: a good hub points to many good authorities, while a good authority is pointed to by many good hubs.

Another topology that may be used in the context-based filtering of the present invention is the popularity of Web pages. The popularity of a Web page can be roughly determined by monitoring how many times the Web page has historically been contained in the result set of a keyword-based query. This gives rise to an important distinction between popularity and reputation. Popularity is the result of event-based filtering or collaborative-based filtering and encompasses the general opinion of a wide audience regarding a given object, for example, a Web site address ("URL"). Reputation, by contrast, is the product of an existing or inferred topology and has a much narrower semantic meaning.

As stated above, the present invention comprises a system and method that incorporates, for example, at least one of and preferably all four of the above-described filters to obtain user preferences and provide user recommendations for unseen physical and information goods and services. The term "unseen" is used to describe those physical and information goods and services that a user has not yet encountered, does not yet know about, has not yet obtained information about, or has not found. It is used in contrast to the term "seen", which is used to describe physical and information goods and services that a user has encountered, knows about, has obtained information about, or has found. A good or service is "unseen" by a user when that user is unaware of the relevance of the good or service to his/her preferences. Conversely, a good or service is "seen" by a user when that user is made aware of the relevance of the good or service to his/her preferences.

Figure 5:
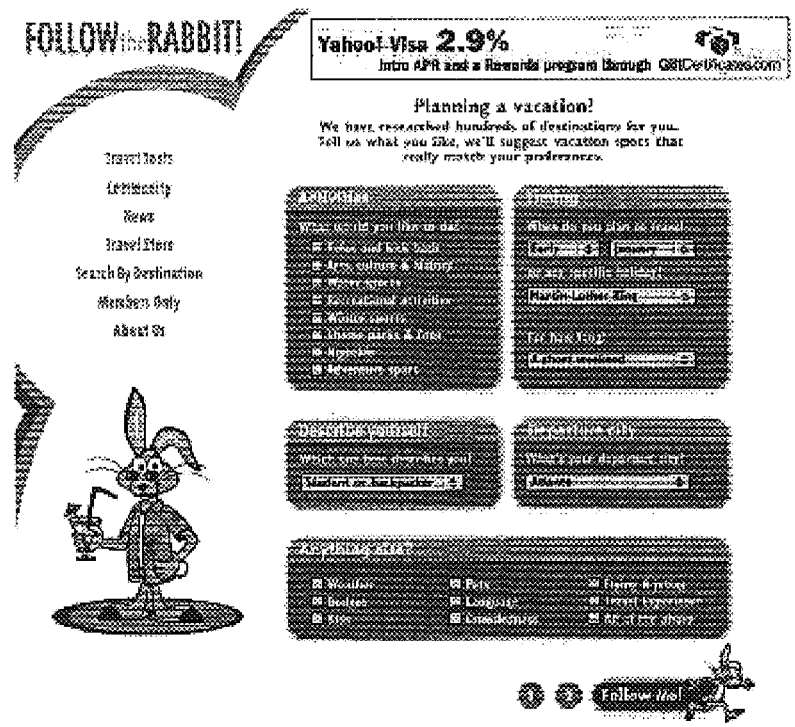
FIG. 5 illustrates an exemplary web page interface.

The preferred embodiment is a vacation recommender system and method that matches a user profile and user preferences with recommendations of vacation destinations. The method of the present invention is roughly illustrated in exemplary FIG. 7. In P1 (Search Criteria Input), the user, through a Web page interface illustrated in exemplary FIG. 5, is prompted to input search criteria by answering a variety of questions to indicate which vacation features are most important to him/her. For example, the user may indicate that he/she is interested in vacations that involve many activities. He/She may optionally further define the search criteria, for example, by indicating that he/she is interested in vacations that involve sports activities generally, or even specific sports activities such as, for example, water polo. If the user is a first-time user, the system creates a unique identifier for him/her and tracks the session. As the user information and search criteria are collected during the session, they are logged and stored in a mapping database of the present invention for later retrieval and use by the system during additional filtering. Once the user has fully specified the search criteria, he/she indicates his/her desire to receive the system's recommendations.

During the session, the user may be asked to register as a user of the system by providing a name, a valid e-mail address and a password. Additionally or alternatively, he/she may be automatically identified, for example, through the use of cookies or by matching information provided by him/her to information in a pre-existing database (such as, for example, the mapping database).

Figure 6:
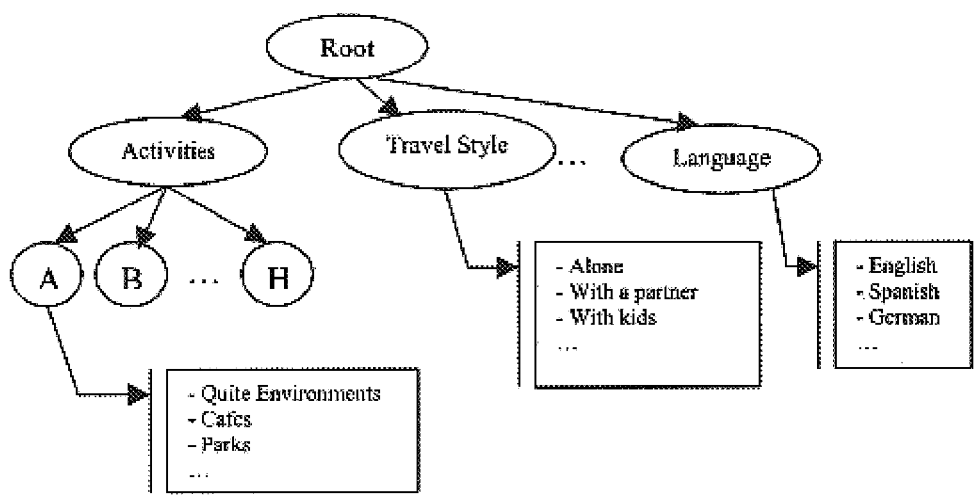
FIG. 6 illustrates an exemplary mapping database with a multi-level tree-like structure.

The mapping database has a multi-level tree-like structure illustrated in exemplary FIG. 6 that provides flexibility, enabling the system to be easily adapted to business domains other than the travel industry. It should be noted that the mapping database can be, for example, a single database, a set of databases, or any other database arrangement and can include, for example, one or more distributed databases. The multi-level structure makes it possible to group and regroup the data without requiring significant changes to the web generating scripts. The multi-level structure permits the easy addition and manipulation of categories, subcategories and sub-subcategories, enabling the system to more easily differentiate between basic and advanced (detailed) searches. In addition, the design of the mapping database enables the system to dynamically generate question and answer templates for the collection of user preferences. By eliminating the need for system administrators to hand-code such templates into hypertext markup language ("HTML"), this enables the system to be easily applied to multiple business domains.

Figure 8:
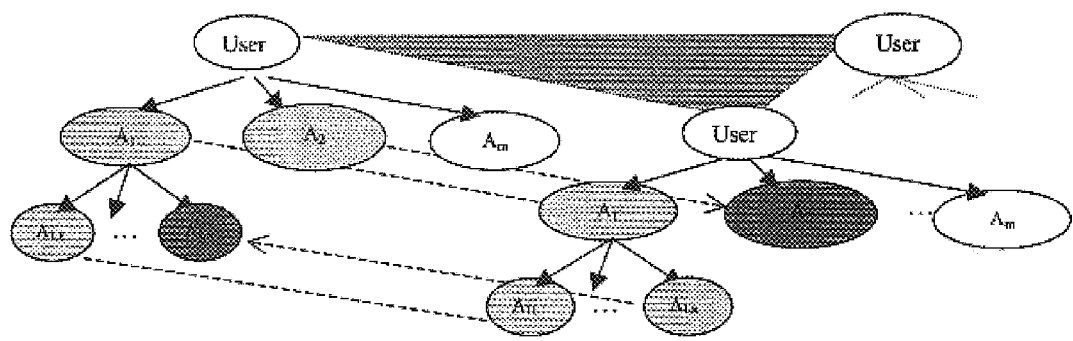
FIG. 8 illustrates an exemplary user profile.

Further, the multi-level structure of the mapping database enables the system to represent criteria and features specific to a given business domain as a flexible "domain tree". By extracting the n-most representative domain features for the particular business domain, such a domain tree, or "domain space", for that domain can be constructed. For example, for the travel industry domain, representative domain features such as available activities, weather statistics, and budget information for each destination can be represented as a travel industry domain tree. Consequently, each item to be recommended can be mapped in this domain space. For example, a given vacation may be mapped in this domain space as having few available activities, great weather, and low cost. Similarly, user preferences can be mapped in this domain space. For example, a given user may prefer a vacation with many activities and moderately nice weather, but may not be concerned with cost. In addition, the system is capable of building and mapping a user profile in the domain space as the user interacts with the system over time. One example of a user profile is illustrated in exemplary FIG. 8.

It should be understood that the multi-level structure of the mapping database preferably depends on the domain space generated as a result of the domain modeling procedure, although it is not limited to this embodiment. By mapping the items and the users in the same domain space, the system is able to automatically and accurately match each user with items that correspond to his/her needs, and eliminate those items that do not correspond to his/her needs. The mapping procedure also enables the system to present to the user explanations as to why each item was recommended. Cross-domain mapping is possible if an attribute defined in one domain space has its equivalent in another domain space. Therefore, interests expressed by a user are not limited to the domain space under which the interest has been captured. The corresponding entry in the user profile can be reutilized for completing profiling information in a different domain space. Therefore, cross-domain recommendations may be provided inasmuch as attributes in one or more domain spaces can be analyzed to provide recommendations in another domain space.

The user profile may be modified over time as discussed above according to an event-based filtering process that uses information about the preferences ("attributes") that the user has "visited", that is, attributes in which the user has expressed an interest. Visited attributes are represented in exemplary FIG. 8 by nodes $A_1$, $A_2$, and $A_{1,1}$ (all dependent from node User1) and nodes $A_1$, $A_{1,1}$ and $A_{1,n}$ (all dependent from node User2). To enable the event-based filtering, a plurality of two-value pairs are assigned to each visited attribute and maintained as part of the user profile. Each two-value pair comprises a short-term memory value (STM) and a long term-memory value (LTM). The LTM is calculated as the ratio of the number of times a user has selected an attribute divided by the total number of searches performed by the user. An attribute is assigned an STM of 1 if the attribute has been selected. However, the STM begins to decay at a constant factor $\beta \epsilon [0,1]$ if the user does not continue to select the attribute during subsequent query sessions. The value of the STM decays according to the following equation: $d(STM^{t+1)}=STM^{(t)} \times \beta$. The average of the LTM and the STM is calculated using, for example, software, and is defined as the attribute-interest ratio. It is possible to determine in which attributes the user has shown the most interest by examining the attribute's attribute interest ratio. The closer the ratio is to 1, the greater the interest shown.

The user profile may also be modified, as the user interacts with the system over time, according to a collaborative filtering process that attempts to predict the user's interest in "unvisited" attributes, that is, attributes for which the user has not expressly shown an interest. These attributes are represented in exemplary FIG. 8 by node $A_{1,n}$ (dependent from node User1) and node $A_2$ (dependent from node User2). The collaborative filtering process uses information about the similarity between users to predict a user's interest in an unvisited attribute. Initially, a determination is made about which unvisited attribute the user's attribute-interest ratio should be predicted. This determination is made by selecting the most popular visited attribute among those attributes common to profiles of users similar to the user. The similarity among users is calculated prior to this selection by comparing the attribute values in the compared users' profile trees and the extent of any overlap between such values. The basic equations for calculating the similarity between a user U and a user i is:

$$sim(U, i) = \frac{\sum_{j=1}^{M} \hbar^2 * v_{U,j} * v_{i,j}}{\sqrt{\sum_{j=1}^{M} (\hbar * v_{U,j})^2 \sum_{j=1}^{N} (\hbar * v_{i,j})^2}},$$

where $v_{U,j}$, $v_{i,j}$ are the attribute-interest ratios of user U and user i for attributed j respectively, and h is a factor that depends on the depth of the attribute j and the maximum depth of the domain tree. M is the number of common attributes registered in both user profiles. Once a target attribute j has been selected, its predicted LTM for user U, $\hat{v}_{U,j}$, is calculated as:

$$\hat{v}_{U,j} = \frac{\sum_{i=1}^{N} sim(U, i)(v_{i,j})}{\sum_{i=1}^{N} sim(U, i)},$$

where N is the number of users in the mapping database with non-zero similarity that have an attribute-interest ratio for j. The STM for j is set to 1 every time it is selected as a target, but decays in the same way as other attribute's STM, if it is not selected for prediction. If the user visits a predicted node in the future, the event-based information overwrites whatever prediction has been made.

It should be noted that the calculation of predictions regarding a user's interest in an attribute can produce errors if a user's interaction with the system is erratic or if the user's interest level changes frequently. Therefore, the system is adapted to let the user manually update, through, for example, a graphical interface, his/her user profile to correct any incorrectly predicted attribute interest. The user's manually-specified value overwrites the calculated attribute-interest ratio. In this manner, the system is self-correcting and is adapted to produce more accurate results.

Figure 7:
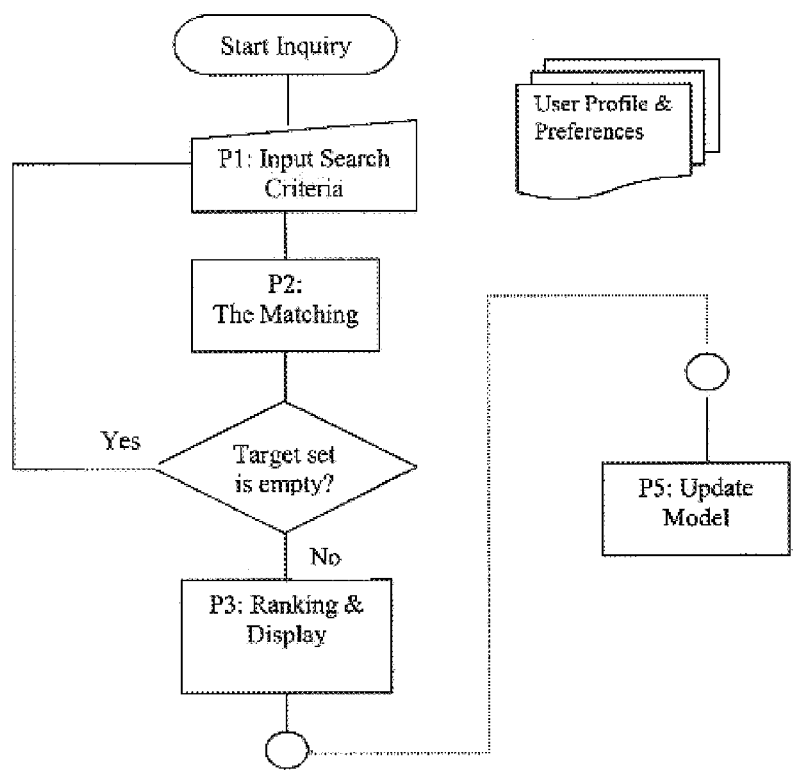
FIG. 7 illustrates an exemplary method of the present invention.

In P2 (Matching) of exemplary FIG. 7, in response to the user's request to receive recommendations, the result space is reduced by applying the content- and context-sensitive rules and generating a matching percentage. Similar to the mapping of the user's profile in the travel industry domain space, each vacation destination that may be recommended by the system has been mapped in the same travel industry domain space. Therefore, domain-dependent content- and context-sensitive rules are applied to perform a direct feature-based similarity comparison between the enhanced query (the user's currently provided search criteria combined with the user's mapped user profile) and the mapped representations of the vacation destinations. Using the search criteria and the user profile, a matching percentage is calculated for each vacation destination that indicates the relevance of the respective vacation destination to the user, with 0% being the least relevant and 100% being the most relevant. This matching percentage is calculated as a weighted sum of the values of the ratings assigned to each attribute for each destination, weighted by the value of the attribute in the user's profile and a factor that depends on the depth of the attribute in the domain tree as follows:

$$P_{U,I} = 100 \times \frac{\sum_{j=1}^{|A_U|} U(j)I(j)\hbar}{\sum_{j=1}^{|A_U|} U(j)\hbar},$$

where $A_U$ is the set of non-zero valued attributes for user U, u (j) is the attribute-interest ratio of user U for attribute j, I(j) is the rating for attribute j ascribed to item I, and h is a factor that depends on the depth of the attribute j within the domain tree and the tree's maximum depth.

Data mining can be performed, for example, on the user, session, attribute and attribute value information captured in each search, to generate new context-sensitive rules. Examples of context-sensitive rules that can be used to reduce the result space for the travel industry business domain are included in the section entitled "CONTENT- AND CONTEXT-SENSITIVE RULES FOR TRAVEL INDUSTRY BUSINESS DOMAIN".

In P3 (Ranking and Display), the returned items are ranked according to their predicted relevance to the user, and the system presents the sorted list to the user. The system further updates the user profile by logging and processing, according to the event-based filtering and collaborative filtering processes described above, both the search criteria and the actions taken by the user in response to the result list.

In P4 (Update Model), the system updates the similarity weights between users that are used during the collaborative filtering process described above to predicts the user's interest in unvisited attributes.

Figure 9:
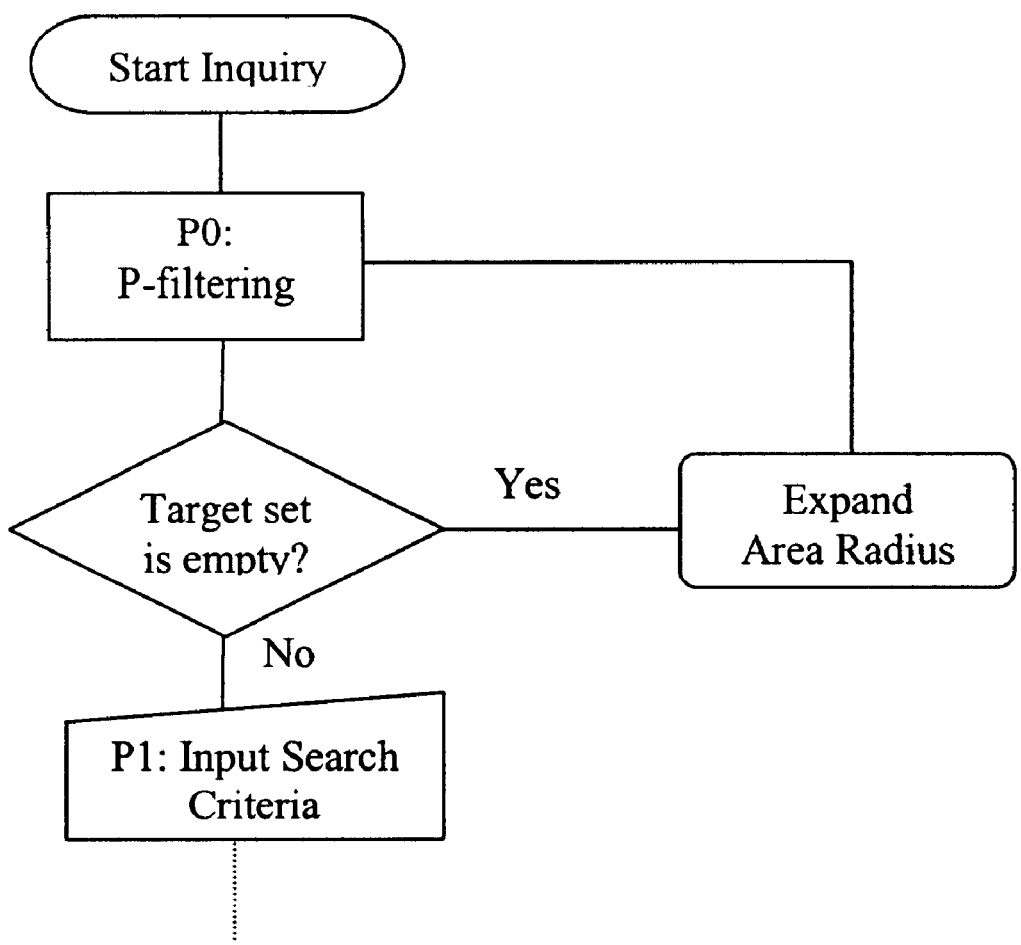
FIG. 9 illustrates an alternative embodiment of the present invention.

In an alternative embodiment, illustrated in exemplary FIG. 9, the present invention incorporates a position-based information filtering process and can be adapted for use with wireless client applications. In P0 (P-filtering) of this embodiment, the input space (the space containing all items to be searched, initially comprising, for example, all items represented in the domain space) and the result space are reduced by applying positioning constraints, such as a user location, obtained by the system. For example, a wireless device can obtain the location of a user of the wireless device, either automatically using, for example, an embedded global positioning system or triangulation calculator, or through input by the user. Once the location is obtained, the location information is automatically applied to reduce the result space from which the recommended items are to be extracted. For example, those restaurants not found in the urban area where the user is located are filtered out from the result list. During the collaborative filtering process described above, the similarities between the user and users who are related to the current locality are calculated. It should be noted that when location is considered contextual information, the position-based filtering can also occur as part of the context-based filtering process described above. Because the system's filters are layered, the system is able to easily accommodate additional filters.

It should be noted that the incorporation of location information is not only useful for enhancing wireless client applications, but as a general matter improves the relevance of recommendations provided by the system. That is, each user profile can include a user willingness attribute that indicates how willing a user is to travel to a more distant location if the recommendation matches his/her preferences closely, or to remain in a local area even though no attractive recommendations have been returned.

While the above discussion has been primarily directed to tailoring the present invention for use with e-commerce Web sites and other commercial applications, it should be noted that the present invention may also be tailored for use with non-commerce research Web sites and other non-commercial applications.

Although the present invention has been described and illustrated in detail, it is clearly understood that the same is by way of illustration and example only and is not to be taken by way of limitation.

EXEMPLARY CONTENT AND CONTEXT-SENSITIVE RULES FOR TRAVEL INDUSTRY BUSINESS DOMAIN

Content-Based Rules

These are based on the values of selected attributes in the domain-tree and/or keyword content searches.

1. ACTIVITY- User can select multiple activities
    Factors:
        Time- Early Jan, Mid Jan, Late Jan, etc.
        Activity- Relax, Water Sports, Winter Sports, etc.
    Table: VIEW_ATTRIBUTE_TIME
    Query: Include Destination
        a) If ACTIVITY.VALUE >2, for all selected activity/activities at that time of the year.
2. WEATHER- Combination of multiple and single selection
    Factors:
        Time - Early Jan, Mid Jan, Late Jan, etc.
        Weather - Warm, Cold, Dry, Sunny, etc.
    Table: VIEW_ATTRIBUTE_TIME
    Query: Include Destination where
        a) Warm           HIGHTEMP.VALUE>70° F.
           Cool or mild   50<HIGHTEMP.VALUE>75° F.
           Cold           HIGHTEMP.VALUE=<55° F.
        b) Dry            HUMIDITY.VALUE=<50
           Humid          HUMIDITY.VALUE>50
        c) Sunny          {(% of SUNNY.VALUE)/(% of
                          SUNNY.VALUE) + (% of
                          CLOUDY.VALUE)} *100
        d) Windy or breezy WIND.VALUE>12
        at the time of the year given.
3. WHO's GOING - Single Selection
    Factors:
        Time- Early Jan, Mid Jan, Late Jan etc.
        Who is Going- Myself, Me and friends, Me and my family, etc.
    Table: VIEW_ATTRIBUTE_TIME
    Query: Include Destination
        b) If WHOISGOING.VALUE > 2 for selected value at that time.
4. ENVIRONMENT
    Factors:
        Environment- Urban/City, Seaside, Desert, etc.
    Table: VIEW_ATTRIBUTE_TiMELESS
    Query: Include Destination
        a) ENVIRONMENT.VALUE = TRUE for any selected Environment AND order by destination having closest exact match to user preferences.
5. CROWDED- User can select only one option
    Factors:
        Time- Early Jan, Mid Jan, Late Jan etc.
    Table: VIEW_ATTRIBUTE_TIME
    Query: Include Destination
        a) For option, "I want to avoid crowds at all costs."
            LEVELOFCROWD.VALUE < 1 at that time.
        b) For option, "I don't mind some crowds."
            LEVELOFCROWD.VALUE < 3 at that time.
        c) For option, "Crowds don't bother me at all."
            Include all destinations.

-continued

6. REGION- User can select more than one option
    Table: DESTINATION, COUNTRY, REGION
    Query: Include Destination
        a) Get destinations only from selected regions.
7. TRAVELER SUPPORT- Multiple Selection allowed
    Factors: Support Services, Tourism Information, etc.
    Table: VIEW_ATTRIBUTE_TIME
    Query: Include Destination
        a) If TRAVELERSUPPORT.VALUE > 2 for all selected attributes
8. HEALTH & SAFETY - Multiple Selection allowed
    Factors: Overall Safety, Healthcare Options, etc.
    Table: VIEW_ATTRIBUTE_TIME
    Query: Include Destination
        a) If HEALTHAND SAFTETY.VALUE > 2 for all selected attributes
9. FOREIGN LANGUAGE- Multiple Selection allowed
    Factors: English, Spanish, French, etc.
    Table: VIEW_ATTRIBUTE_TIME
    Query: Include Destination
        a) If LANGUAGE.VALUE> 2 for all selected attributes.
        b) Also include all those destinations where LANGUAGE.VALUE=5 in any language, irrespective of value in other languages.
10. KEYWORD SEARCH- User can type only one keyword
    Factors: DR Reports in Text files, List of destination after search, MaxMatch_Constant
    Table: Destination, DR REPORTS
    Query: Include Destination
        Get Destination after doing string search (e.g., List 1)
        a) If # of destination (e.g., List 2) returned from our search engine is more than <MaxMatch_Constant>, show only those destination which are in both lists (List 1 & List 2).
        b) If # of destination in List 2<MaxMatch_Constant, Show List 2

Exemplary Context-Based Rules

These are based on relational values that derive from the selection of two or more items in the recommendation space. For example, the relation between the ORIGIN city (departure city) and the DESTINATION.

11. BUDGET- Single Selection
    Table: VIEW_ATTRIBUTE_TIMELESS.
    If RENTACAR.VALUE =TRUE THEN
        Car Rent Cost = $ 25
    ELSE
        Car Rent Cost = $ 0
    For Travel Cost
    Table: ORIGIN_DESTINATION
    If user is ready to fly then
        Travel Cost = AIR_FARE.VALUE
    Else if user is driving then
        Travel Cost = DRIVE_COST.VALUE
    Else if user is taking Train
        Travel Cost = TRAIN_COST.VALUE
    Else
        Travel Cost =SEA_COST.VALUE
    For Hotel Cost
    Table: DESTINATION_ACCOMODATION
    If User selects "Luxury hotels" then
        HOTEL TYPE = 1
    Else if User select "Expensive Hotels" then
        HOTEL TYPE = 2
    Else if User select "Mid-range hotels" then
        HOTEL TYPE = 3
    Else if User select "Budget hotels" then
        HOTEL TYPE = 4
    Else if User select "Rock-bottom hotels" then
        HOTEL TYPE = 5
    Else
        HOTEL TYPE = 6

-continued

```
        Hotel cost = Select DOUBLE_ROOM
                From DESTINATION_ACCOMMODATION
                Where ACCOMMODATION_TYPE =HOTEL TYPE
        Total Cost =Travel Cost +Hotel Cost +Car Rent Cost
 12.    SCARED TO FLY / JET LAG - User can select only one option
            Factors: Duration of vacation, Distance, Time Zone
            Table: ORIGEN_DESTINATION
        Query: Include Destination
            a) For option "YES" (Look for destination in only USA,
               Canada and Mexico). They can take Ship, Train or Car.
               Check table
               SOURCE_DESTINATION to see if it is possible to reach
               destination within the allotted time.
                Flying Short Weekend           (TRAVEL_TIME < 4 Hrs)
                Long Weekend            (TRAVEL_TIME < 9 Hrs)
                One Week                (TRAVEL_TIME < 17 Hrs)
                More Than a Week        Does Not Matter
                Driving, Ship or Train Short Weekend           (TRAVEL_TIME < 5 Hrs)
                Long Weekend            (TRAVEL_TIME < 10 Hrs)
                One Week                (TRAVEL_TIME < 18 Hrs)
                More Than a week        Does Not Matter
            b) For Option "extremely sensitive"
               Short Weekend
               (TIME_ZONE_DIFF.VALUE)=0
               Long weekend
               (TIME_ZONE_DIFF.VALUE)=<1
               One week
               (TIME_ZONE_DIFF.VALUE)=<3
               Two Weeks
               (TIME_ZONE_DIFF.VALUE)=<6
               Three weeks
               (TIME_ZONE_DIFF.VALUE)=<9
               Month
               Anywhere
            c) For option "somewhat sensitive"
               Short Weekend (TIME_ZONE_DIFF.VALUE)=<3
               Long weekend
               (TIME_ZONE_DIFF.VALUE)=<6
               One week
               (TIME_ZONE_DIFF.VALUE)=<9
               Two Weeks
               Anywhere
            d) For option "not bothered by jet lag"
               Anywhere
 13.    DURATION OF VACATION- User can select only one option
        TABLE: ORIGEN_DESTINATION
                Flying Short Weekend           (TRAVEL_TIME < 3.5 Hrs)
                Long Weekend            (TRAVEL_TIME < 7 Hrs)
                One Week                (TRAVEL_TIME < 15 Hrs)
                More Than a Week        Does Not Matter
                Driving, Ship or Train Short Weekend           (TRAVEL_TIME < 5 Hrs)
                Long Weekend            (TRAVEL_TIME < 8 Hrs)
                One Week                (TRAVEL_TIME < 16 Hrs)
                More Than a Week        Does Not Matter
        If user select = Relaxing
                Flying Short Weekend           (TRAVEL_TIME < 2.5 Hrs)
                Long Weekend            (TRAVEL_TIME < 4 Hrs)
                One Week                (TRAVEL_TIME < 10 Hrs)
                More Than a Week        Does Not Matter
                Driving, Ship or Train Short Weekend           (TRAVEL_TIME < 3.5 Hrs)
                Long Weekend            (TRAVEL_TIME < 5 Hrs)
                One Week                (TRAVEL_TIME < 11 Hrs)
                More Than a Week        Does Not Matter
```

What is claimed is:

1. A method for obtaining user preferences, comprising:

providing input search criteria;

matching information about a user to information stored in a database, the database having a multi-level structure enabling grouping of the information for scalability, the information about the user modified by an event filter;

selecting a target attribute and calculating a long-term memory value for the user, and setting a short-term memory value to 1 each time the target attribute is selected;

ranking and displaying attributes according to a predicted relevance to the user based on the matched and selected calculations; and updating the information in the database to reflect a similarity between users in a group and to better predict an individual user's interest in one of the attributes.

2. The method according to claim 1, further comprising:

assigning a plurality of two-value pairs to each visited attribute, each two-value pair comprising a short-term memory (STM) value and a long term-memory (LTM) value, the LTM being calculated as the ratio of the number of times one of the users has selected the attribute divided by the total number of searches performed by the user, the STM decaying at $\beta \in [0,1]$ based on $d(STM^{(t+1)}) = STM^{(t)} \times \beta$; and averaging the LTM and STM to create an attribute-interest ratio, where an attribute interest level corresponds to the attribute-interest ratio.

3. The method according to claim 1, further comprising:

determining one of the user's interest in an attribute using a collaborative filter by selecting the most visited attribute among the attributes common to the group, wherein a similarity between users in the group is used to predict the interest, a similarity calculated by comparing the attribute values in a compared users' profile tree with any overlap between the values using the following equation:

$$sim(U, i) = \frac{\sum_{j=1}^{M} \hbar^2 * v_{U,j} * v_{i,j}}{\sqrt{\sum_{j=1}^{M} (\hbar * v_{U,j})^2 \sum_{j=1}^{N} (\hbar * v_{i,j})^2}}.$$

4. A system for obtaining information, comprising:

a content-based filter to acquire and maintain at least one user profile, and comparing instances being filtered using a similarity measure to evaluate relevance;

an attribute based collaborative filter to monitor shared impressions of a group of user profiles, the impressions rated such that unknown impressions can be selected and shown to specific users in the group based on a rating;

an event-based filter to track movements of users; and a context-based filter to determine the a relevance of contextual information embedded in searches conducted by the users.

5. The system according to claim 4, further comprising:

an automated collaborative filter to determine users in the group having similar impressions, and to analyze and facilitate the creation of interest groups for the purpose of targeting specific users.

* * * * *